Nov. 27, 1945.    H. E. BAER    2,389,754
AIRCRAFT PROTECTIVE SYSTEM
Filed May 15, 1941
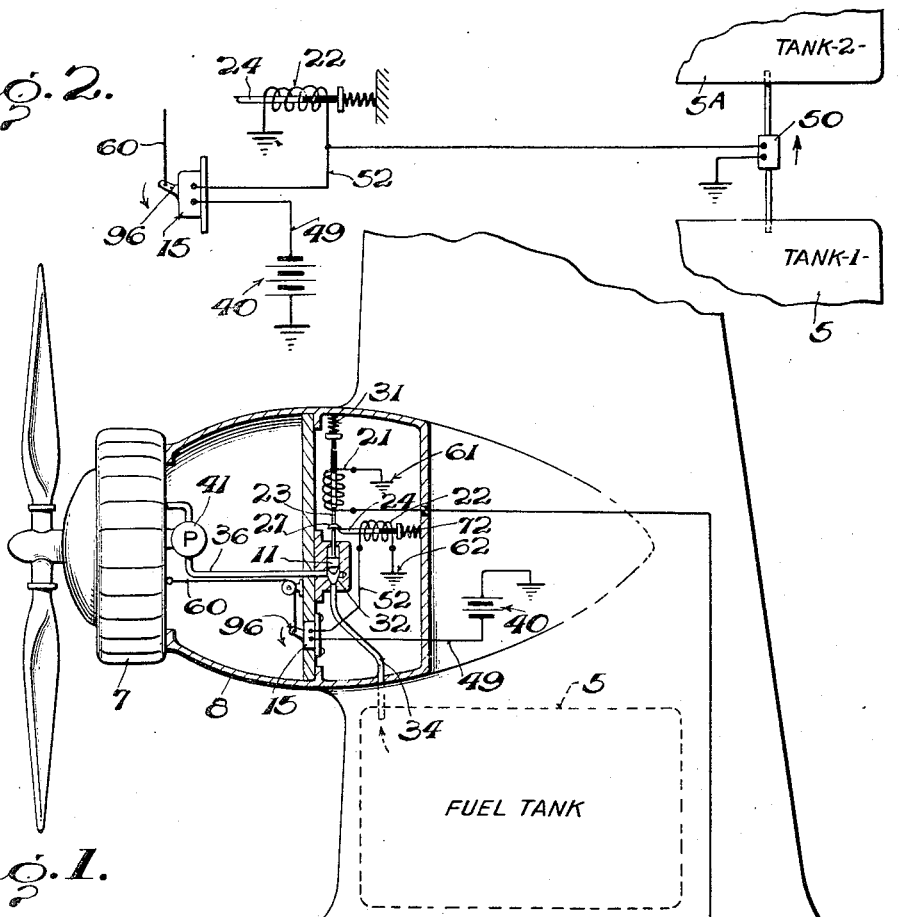
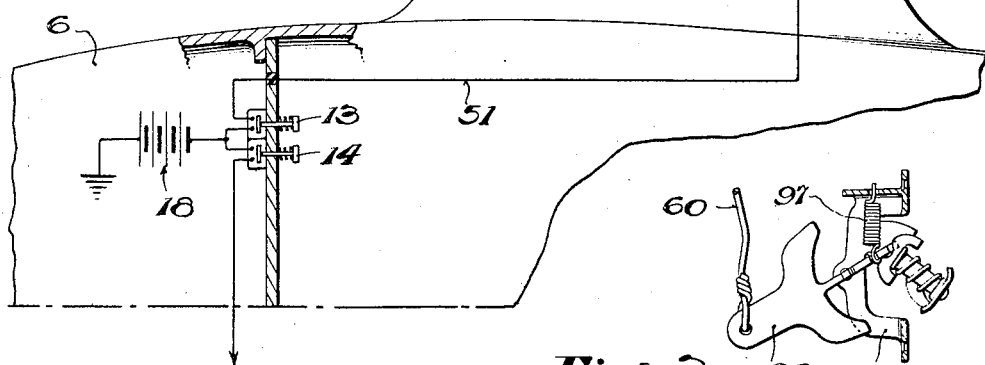
INVENTOR
Howard E. Baer
BY
Martin J. Finnegan
ATTORNEY Patented Nov. 27, 1945

2,389,754

UNITED STATES PATENT OFFICE 2,389,754

AIRCRAFT PROTECTIVE SYSTEM

Howard E. Baer, Garfield, N. J., assignor to Bendix Aviation Corporation, South Bend, Ind., a corporation of Delaware Application May 15, 1941, Serial No. 393,635

4 Claims. (Cl. 244—135)

This invention relates to aircraft, and particularly to the protection of aircraft against damage by fire or other hazard following rupture of a fuel line supplying one or more of the craft's engines and occasioned by engine displacement or loss.

It sometimes occurs, particularly in military combat, that the fuel line between the fuel source and the engine of an aircraft is ruptured by the displacement or loss of an engine. A rupture of this character permits spilling and waste of the fuel at the point or points of the rupture with the result that not only the available fuel supply is reduced for utilization by remaining engines not displaced but a fire hazard is thus created. The present invention removes both these sources of trouble by providing automatically acting means for sealing the broken fuel line, or lines, at or adjacent the fuel source and in response to engine displacement or loss.

Other features of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

In the drawing,

Fig. 1 is a diagram of the control system, shown in its relationship to a craft whose fuel supply is to be controlled;

Fig. 2 is a diagram of an alternative form of control; and

Fig. 3 is an internal view of certain parts of the automatic switch.

In the drawing reference character 5 designates the fuel tank, or one of a series of fuel tanks, carried by a plane 6 having a corresponding series of engines, of which one is shown at 7. Within the nacelle 8, which carries the engine 7, is a control valve 11, corresponding to that shown and claimed in application of Charles I. MacNeil, No. 392,522, filed May 8, 1941, and owned by the assignee of the present application. A similar control valve (not shown) is provided in the nacelle (not shown) on the other wing of the craft, and these units are adapted to be actuated initially by switches 13 and 14, respectively, located in the cock-pit, or pilot's compartment; both switches being in circuit with source 18. If more than two engines are used, there will, of course, be additional control valves, with corresponding electrical connections.

Each control valve, like the valve 11 of Fig. 1, is controlled by a pair of solenoids 21 and 22, the former acting upon a plunger rod 23 and the latter upon a plunger 24 having a latching end adapted to cooperate with a frusto-conical sear 27 forming part of rod 23. Also forming part of rod 23 is the valve element 11, urged by a spring 31 to engage valve seat 32 and thus stop fuel flow from pipe 34 to pipe 36, the former leading from tank 5 and the latter to pump 41 which delivers fuel to engine 7. Wires 51 and 52 lead from switches 13 and 15, respectively, to solenoids 21 and 22, respectively; said solenoids being separately grounded, as shown at 61 and 62. Switch 15 is the automatic element, to be further described.

Closure of switch 13 (momentarily only) takes place at the outset. This momentary closure of switch 13 causes solenoid 21 to raise plunger 23, thus opening valve 11 and causing spring 72 to press latch 24 into locking engagement with sear 27, as shown in Fig. 1. This relationship continues during normal flight of the craft, thus permitting free flow of fuel past the open valve 11, and into the pump 41 of engine 7. Should there be some extraordinary occurrence, however, such as a displacement or loss of the engine 7, as by military casualty, the taut cable 60, which is connected to and between the engine 7 and the lever 96 of the switch 11, will be slackened or severed with the result that the switch 15 is operated to close a circuit from the source 40 to energize the solenoid 22, thus withdrawing latch 24 and permitting spring 31 to reclose the valve 11. Loss of fuel is thus prevented when the pipe 36 is ruptured due to the displacement or loss of the engine. As an additional feature, an electric or electromagnetic valve control 50 (Fig. 2) may be placed in circuit with switch 15, to permit establishment of a flow diverting path from tank 5 to a second tank 5A serving the surviving engine.

The automatic switch 15 may be of any suitable construction involving a spring-biasing of the contact element toward circuit-closing position; one form of biasing spring being indicated at 97 in Fig. 3. Whenever cable 60 is severed, this spring 97 snaps the lever 96 from the position shown in Fig. 1 (also Fig. 2) to the position shown in Fig. 3, in which latter position a circuit will be established for current flow from conductor 49 to conductor 52, and hence to solenoid 22, with the result heretofore described. The complete switch assembly includes lever 96, spring 97, bracket 107, stationary contact elements (not shown), and a bridging contact element (not shown). The latter contact element is operably connected to a toggle 96 which is constantly urged into the position shown in Figure 3 by a spring 97 (see Figure 3). In this latter position to which it is thus biased, toggle 96 holds the switch contacts of the automatic switch 15 in engagement, one with the other but when shifted in a clockwise direction about its pivot by force exerted through cable 60, thereupon the toggle 96 is shifted so as to open the contacts of switch 15. However, as above noted, any other suitable type of spring-biased switch may be substituted.

Cable 60 has one end secured to the engine (Fig. 1) and the other end to arm 96 of switch 15, and when taut it holds said arm in the switch-opening position. When it slackens, due to breakage, the spring 97 snaps the switch to closed position, as above pointed out.

What is claimed is:

1. In combination with a power plant having a fuel feed conduit connecting the fuel feed source to the engine of said plant; valve means connected in said conduit and effective for precluding the passage of fuel therethrough, at least a pair of coactable electrically actuated devices selectively operable for rendering said valve means effective and ineffective respectively, a switch in circuit with one of said devices for operating the latter to render said valve ineffective, a second switch in circuit with the other of said devices and effective for operating said other device to render said valve effective, and a normally taut member connected between said engine and said second switch for rendering the latter effective when said member is otherwise than taut.

2. In combination with a power plant having a fuel feed conduit connecting the fuel source to the engine of said plant; a valve connected in said conduit and effective for precluding the passage of fuel therethrough, electro-magnetic means connected to said valve and operable during energization for rendering said valve ineffective, solenoid means effective when deenergized for maintaining said valve ineffective upon deenergization of said electromagnetic means, a switch in circuit with said solenoid means and effective for causing energization of said solenoid means to render said valve effective, and a normal taut member connected between said engine and said switch for rendering the latter ineffective when said member is taut.

3. The structure of claim 2 as set forth and defined therein including, a second switch in circuit with said electro-magnetic means for rendering said latter means effective.

4. In combination with an aircraft having a separated pilot's compartment and a power plant having a fuel feed conduit connecting the fuel source to the engine of said plant; a valve connected in said conduit and effective for precluding the passage of fuel therethrough, electro-magnetic means connected to said valve and operable during energization for rendering said valve ineffective, solenoid means effective when deenergized for maintaining said valve ineffective upon deenergization of said electromagnetic means, a switch in circuit with said solenoid means and effective for causing energization of said solenoid means to render said valve effective, a normal taut member connected between said engine and said switch for rendering the latter ineffective when said member is taut, and a second switch disposed in said compartment and connected in circuit with said electro-magnetic means for rendering said latter means effective.

HOWARD E. BAER.